(12) United States Patent
Bernstein et al.

(10) Patent No.: US 7,756,980 B2
(45) Date of Patent: Jul. 13, 2010

(54) USING CHANNEL CONCEPTS TO CONTROL COMPUTER NETWORKING

(75) Inventors: Michael S. Bernstein, Bothell, WA (US); David Switzer, Seattle, WA (US); Daniel J. Polivy, Seattle, WA (US); Bhrighu Sareen, Mississauga (CA)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 11/080,863

(22) Filed: Mar. 14, 2005

(65) Prior Publication Data

US 2006/0203835 A1   Sep. 14, 2006

(51) Int. Cl.
G06F 15/16 (2006.01)

(52) U.S. Cl. .................. 709/227; 709/228; 709/229; 709/250

(58) Field of Classification Search .......... 709/250, 709/227–229; 370/254, 431
See application file for complete search history.

(56) References Cited

U.S. PATENT DOCUMENTS

| | | | | |
|---|---|---|---|---|
| 6,493,751 B1* | 12/2002 | Tate et al. | ............... | 709/221 |
| 7,155,437 B2* | 12/2006 | Chang et al. | ............. | 707/10 |
| 2001/0023446 A1* | 9/2001 | Balogh | .................. | 709/229 |
| 2003/0208632 A1* | 11/2003 | Rimmer | ................. | 709/250 |

FOREIGN PATENT DOCUMENTS

WO   WO 2004/031488 A1 *   4/2004

OTHER PUBLICATIONS

Princeton University, http://web.archive.org/web/20020815212611/http://www.net.princeton.edu/mac/network-config-x/, Aug. 15, 2002.*

\* cited by examiner

*Primary Examiner*—Yves Dalencourt
*Assistant Examiner*—Hee Soo Kim
(74) *Attorney, Agent, or Firm*—Workman Nydegger

(57) ABSTRACT

Described is a system and method that use the concept of channels by which computer users select an appropriate set of network settings maintained in the computer system for a particular network. Upon selection, the corresponding settings are automatically applied by the system. A channel manager manages sets of network settings for various networks, including ad hoc networks, wherein each set contains the information that is necessary to connect to a network. A user interface allows selection of a channel, e.g., via a friendly name. The network settings may be stored in files to allow users to easily copy settings. Complex channels are capable of connecting to different networks at different times in a priority ordering, depending on network availability. The channel manager is able to determine the current channel from current network settings. Metadata may be received and displayed in conjunction with the channel-related user interface.

19 Claims, 6 Drawing Sheets

USING CHANNEL CONCEPTS TO CONTROL COMPUTER NETWORKING

FIELD OF THE INVENTION

The invention relates generally to computer systems, and more particularly to computer networking settings.

BACKGROUND

Contemporary computers expose a bewildering array of networking settings to the user. For example, to use an 802.11 wireless network, a user is able choose between connecting directly to other computers (in an ad-hoc mode) and connecting to an access point of a larger network. If multiple networks are available, the user is also able to decide to which network to connect, and decide what security credentials and passwords to present to get access to that network. An encryption key may also have to be entered.

However, many users are not aware of the networks that are available to them, and/or are not capable of selecting a desired network. By way of example, many users are unaware that their computers are able to connect directly to other computers in an ad-hoc mode using wireless network adapters. Thus, two users that have laptops in close proximity to one another and who wish to exchange data often resort to non-networked data exchange, or limit themselves to communicating in areas where both connect to a wireless access point (e.g., a wireless hotspot) where they can send email.

Moreover, many of the networking choices involve tradeoffs that are somewhat difficult to explain to users. For example, when a user disconnects from a wireless access point that has Internet access, in order to connect to an ad-hoc network of computers, it means that the user loses e-mail access, because the ad-hoc network is not connected to the Internet.

In sum, changing networks requires knowledge of available networks, along with the ability to change networking settings, which is a task that is not easy for many computer users to learn or carry out. In fact, even sophisticated users that are aware of the available networks and the tradeoffs are burdened when frequently changing settings, by having to determine and enter the necessary information to connect to a network. What is needed is a better way for computer users to connect to networks.

SUMMARY OF THE INVENTION

Briefly, the present invention is directed towards a system and method that use the concept of "channels" to help computer users select an appropriate set of network settings that are maintained in the computer system for a particular network. The settings are then automatically applied by the system, e.g., some settings are sent to the network card, credentials are provided to the network, and so forth. Note that by the terms "channel" or "channels," it is meant conceptually as something a user changes to select and make a network connection, rather than a particular wireless networking frequency in the unlicensed band, for example.

In one implementation, a channel manager manages a collection of sets of network settings for various networks, wherein each set substantially contains the information that is necessary to connect to a network. To help the user manage the network settings, the channel manager presents via a user interface each network as one channel of a set of one or more channels, with each channel having a friendly name, for example. By presenting choices to the user in the form of channels, the user is able to choose a suitable network for a given purpose, for example, an "Internet" channel to connect to the Internet, a "Public" (or "Shared") channel to connect to any nearby users, or a "Corporate" channel to connect in a secure manner to the users' corporate network. An advantageous type of user interface is one that allows selection of only one channel, to visibly indicate that selection of one channel/network disconnects the user from another network.

To change the network in response to a channel selection request, the channel manager communicates with a network driver to provide it with the corresponding settings.

The network settings may be stored in a file system, with one file for each channel. This allows users to easily copy settings, including by non-networked means such as floppy disks, USB drives, or infrared file communication. The channel manager also maintains a master structure for keeping information about the files, which may comprise another file, and/or a directory structure.

There may be different types of channels, including a simple channel that is able to establish a connection to one specific network, and a complex channel that is capable of connecting to different networks at different times, depending on which one of its corresponding networks is available. A complex channel may have a priority order for attempting connections.

Other aspects of the present invention include the channel manager being able to determine the current channel from current network settings, and the ability to receive and display metadata in conjunction with the channel-related user interface. Metadata can be used for many purposes, including describing a network, posting information, and providing the settings for connecting to another network.

Other advantages will become apparent from the following detailed description when taken in conjunction with the drawings, in which:

DETAILED DESCRIPTION

Exemplary Operating Environment

Figure 1:
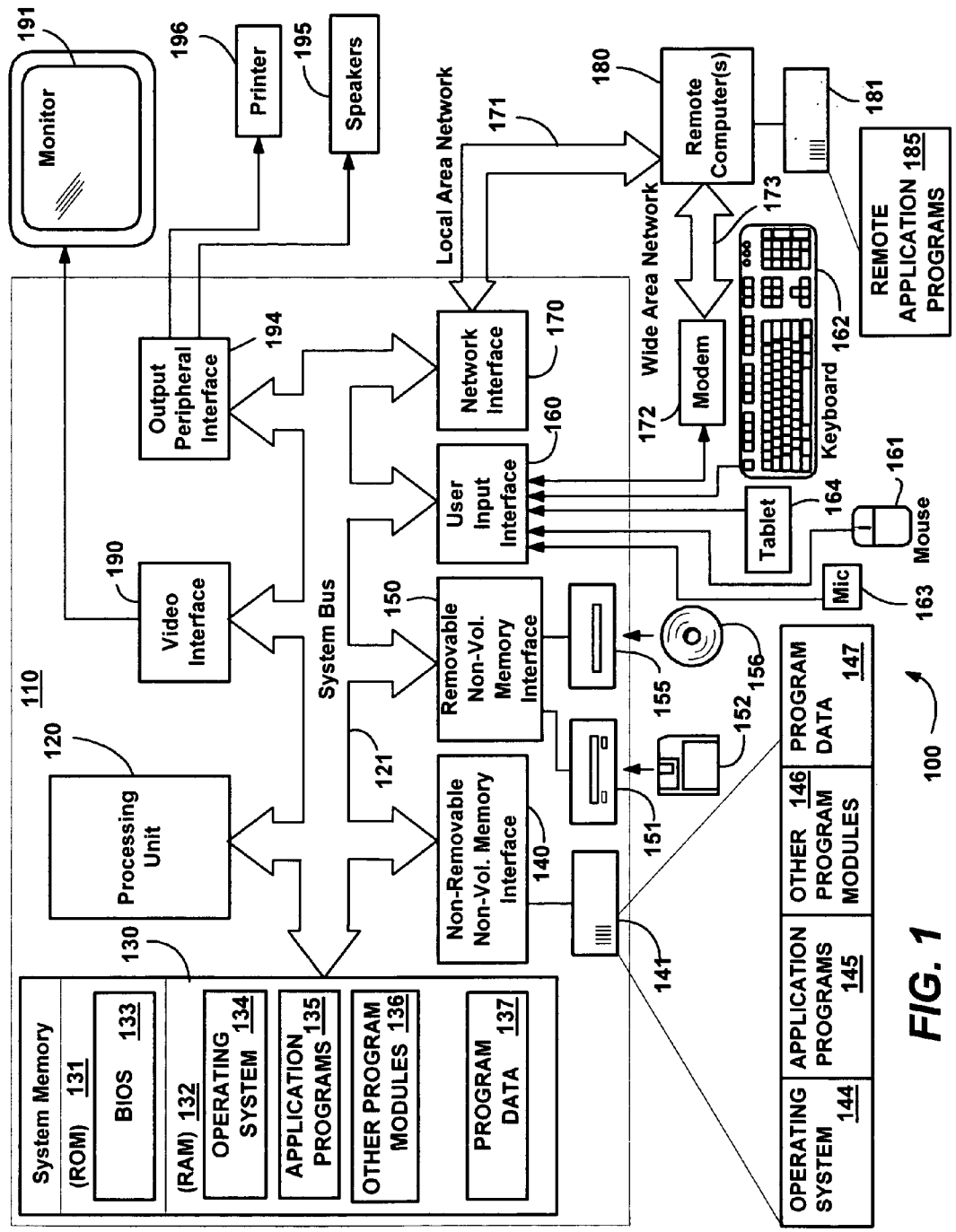
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and a printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Channels to Control Computer Networking

The present invention is generally directed towards a system and method by which computer users are shielded from the complexity of network settings by the use of channel-related concepts. In general, a "channel" is a selectable entity that is associated with the set of required technical and security information needed to connect to one network. Thus, the term "channel" as used herein is not synonymous with the frequency that a wireless device happens to be using for network communication, but rather is directed towards the concept of being able to turn to a given "channel" to obtain a certain network connection in place of any other, somewhat like a television set's channel being switched to show one program instead of another program. For example, most computer users are familiar with the concept of television channels, including that a user can quickly select among available channels, and that in general a typical television set only shows one program/channel at a time. With the present invention, users can quickly select among available networks, yet only selecting one network at a time. While not a perfect analogy to broadcast television channels, (which are frequency-based, whereas the present invention deals with potentially multiple settings that does not necessary correspond to any particular wireless frequency), the channel concept applied to networking is a good metaphor for most computer users.

As will be understood, numerous ways to implement the present invention are feasible, and only some of the alternatives are described herein. For example, in one implementation, a computer program maintains the settings for the various individual networks in corresponding individual files of a file system. One benefit of this type of storage is that computer users are familiar with exchanging files, and thus one user can easily provide other users with a network's settings, or transfer network settings to another computer, simply by providing a file. However, other mechanisms for storing networking settings are feasible, e.g., in a single file, in a database, and so forth. Further, the present invention is primarily described with reference to wireless networks generally, and thus works with 802.11 networks, ultra-wideband-based networks, GPRS networks, and so forth. As such, the present invention is not limited to any particular examples used herein, but rather may be used in various ways that provide benefits and advantages in computing in general.

Figure 2:
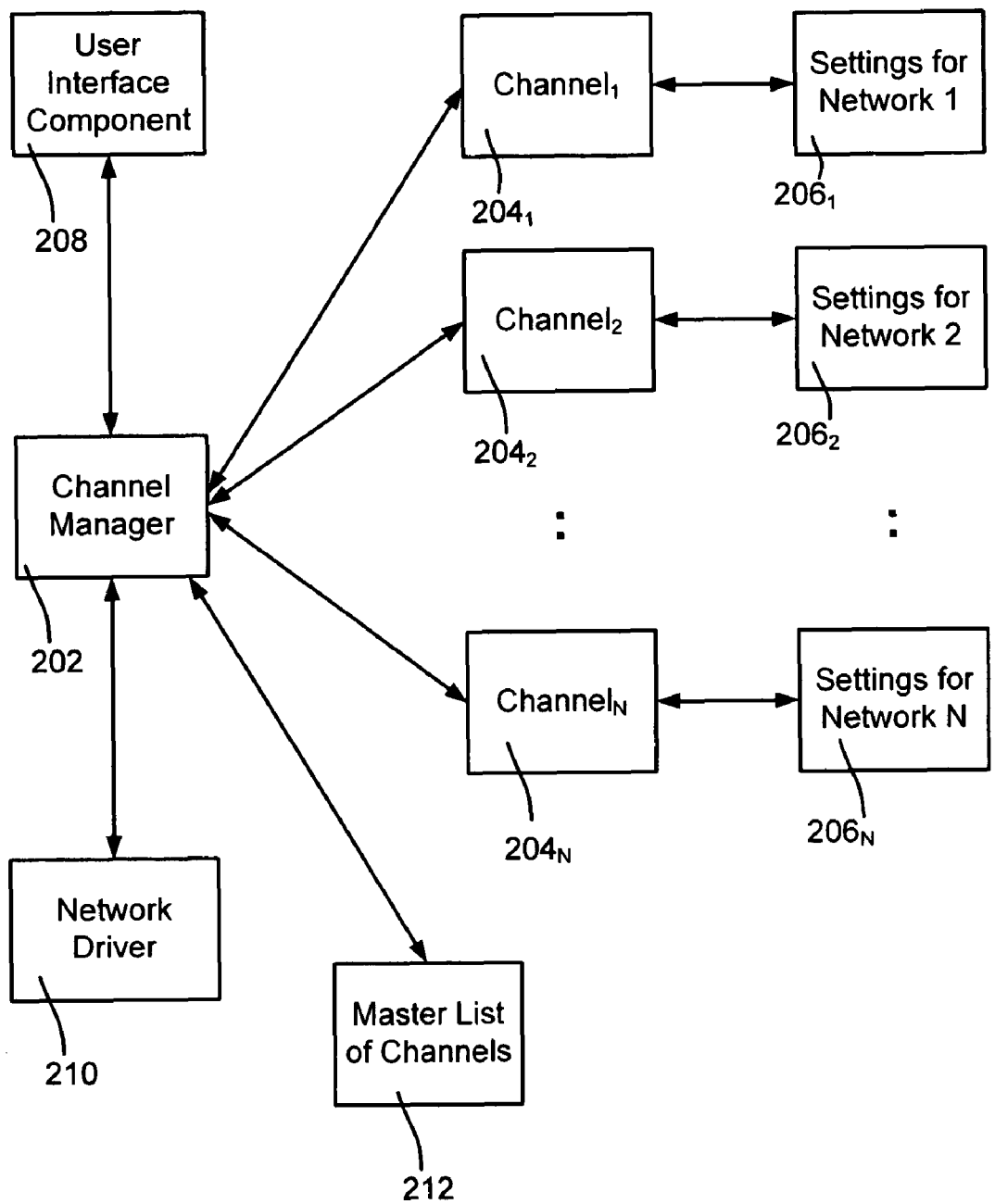
FIG. 2 is a block diagram generally representing components and data in a computer system for providing channels that represent network settings, in accordance with various aspects of the present invention.

Turning to FIG. 2, in one example implementation, a computer program comprising a channel manager 202 manages a possibly complex collection of network settings for various networks. For any given network, such settings may include a network name (e.g., SSID), one or more frequencies or frequency ranges, a password, a user identity, any certificates to exchange, whether encryption is present or not, (and if so encryption key-related data), billing information, and so forth; essentially whatever information that is necessary to connect to a network. Note that for protection, a user may elect to independently supply some security information such as a password, and thus some information beyond the settings may be needed to establish a connection.

In accordance with various aspects of the present invention, to help the user manage the network settings, the channel manager 202 presents each network as one channel of a set of one or more channels $204_1$-$204_N$, hiding the details of the various network settings $206_1$-$206_N$ behind the channel representations $204_1$-$204_N$. In one implementation, the channel has a friendly name, e.g., assigned by the user, whereby each channel $204_1$-$204_N$ essentially may comprise a named mapping to a set of network settings for a given network. In other implementations some or all of the channels may comprise an object or the like that includes (or accesses as needed) the network settings, and can execute methods necessary to use those settings to make the network connection.

By presenting choices to the user in the form of channels, the user is able to choose a suitable network for a given purpose, for example, an "Internet" channel to connect to the Internet, a "Public" (or "Shared") channel to connect to any nearby users, a "Corporate" channel to connect in a secure manner to the users' corporate network, and so forth. In addition to making the user's choice simple and self-explanatory, because the concept of switching channels implies that a user can be on only one network at a time, users are not surprised to discover that access to Internet web sites may be lost when switching away from the "Internet" channel to another channel. Note that certain channels such as the Public channel may be predefined, and for example, be provided with new computer systems.

As further represented in FIG. 2, the channel manager 202 includes or is associated with a user interface component 208 to allow the user to control the operation of the channel manager 202. For example, to present available channels to the user, the user interface 208 queries for or otherwise receives a list of available channels via the channel manager 202. The user interface 208 may also request that the channel manager 202 change the channel, that is, connect to another network, such as in response to a user request or some other occurrence. For example, a scheduled event may change the channel and corresponding network, or a program that needs a particular network may automatically (or in conjunction with a prompt) change the channel during launch or execution; closing the program may automatically reset the network settings.

To change the network in response to a channel change request, in one implementation, the channel manager 202 has access to the system's networking mechanism (e.g., a network driver 210 and/or other components) that is capable of accepting settings in order to connect to a network. The channel manager 202 provides the settings to the network driver in response to the request, and an attempt to connect to the new network is made. Note that the channel manager 202 may obtain information about which networks are currently available, and hide or otherwise disable (e.g., gray out) channels that cannot be connected to at the current time.

Figure 3:
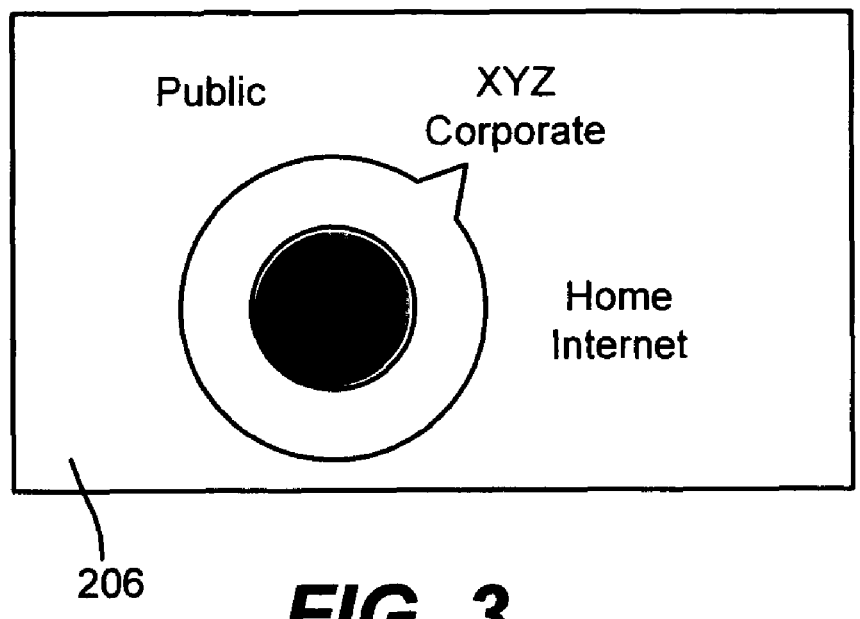
FIGS. 3 and 4 are representations of user interfaces that allow selection of only one channel at a time, for connecting to a corresponding network, in accordance with various aspects of the present invention.
Figure 4:
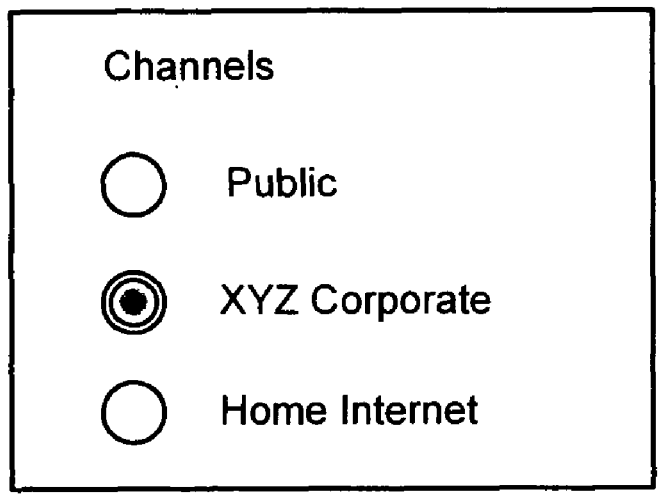

The user interface 208 may present a visual representation that looks like other kinds of well-known channel changers. For example, FIG. 3 shows a channel change mechanism 330 of the user interface 208 that reminds the user of a channel dial, except that on typical computer systems the user switches the dial via a pointing device or keyboard key combination rather than physically turning a knob. FIG. 4 shows radio buttons 440, which are familiar to computer users, (and are actually named as such based on an old-style radio station selector wherein only one selection at a time is possible). An advantage to these types of selectors is that the user interface reflects the fact that connecting to one network also implies disconnecting from another connected network, if any, e.g., a user cannot turn the dial 330 to two different channels, or force the radio button selector to two different selections at the same time.

Note that although such mutually-exclusive user interface mechanisms do convey information, other types of user interface mechanisms are feasible. For example, drop-down menu-like lists and similar lists may be provided that allow the user to select only one channel. A user may also type in characters, with an accompanying list of channels being narrowed as more characters are entered, until the user indicates in some way that one channel is to be selected.

In general, a channel has a friendly name (like "The Public Channel" or "The XYZ Corporate Network") that may be named and/or renamed by the user. Users may manually configure the settings, and then via the user interface 208 provide the channel manager 202 with a name to associate with the current settings. Channels may also be copied from other computers; although no particular format is necessary, a file of data formatted according to an XML schema is one suitable format for maintaining and/or transferring the settings, and is also extensible for future types of network settings.

Returning to FIG. 2, the channel manager 202 is responsible for maintaining the network settings $206_1$-$206_N$, for providing a list of named channels to the user interface component 208 and for applying the settings to the network driver 210. The channel information can be stored in many different ways, however one advantageous way is to use one data file (in a file system volume) per channel, with the channel information for its associated network serialized in the file. As can be readily appreciated, by keeping the settings in individual files, even non-sophisticated users can copy settings, including when no network is available, e.g., by floppy disk, USB drives, infrared communication, and the like. Note that this allows a bootstrap type of behavior, e.g., using a relatively slow connection such as infrared to communicate channel settings, and then once the settings are installed, the channel can be selected to use the relatively faster network connection. Further note that such exchanges of file settings that are performed in a non-networked manner provide some level of security, e.g., any keys are only communicated to others by physical medium for floppy disk or USB, or to users in the line of sight for infrared.

Along with the files of settings, in one implementation the channel manager 202 maintains a master structure for keeping information about the files. For example, the master structure 212 may comprise a list in the form of a single master file with the full list of channels and any appropriate metadata. A directory can also be used as the master list 212. In general, the channel manager 202 maintains this master list 212, and can use it to provide the user interface 208 with the channels that are available, e.g., on request. Note that a hierarchy of one or more subdirectories may be used for containing the channel-related files, which the channel manager may monitor or occasionally (e.g., at start up) enumerate to automatically know when a file is changed, e.g., when there is a file add, delete or rename. In this way, changes can occur when the channel manager is not running, yet the channel manager becomes aware of any changes when next run.

The use of files also provides another opportunity, namely automatic reconfiguration of network settings for appropriate users. By way of example, a corporation can provide the settings that allow employees to share files and/or collaborate in a secure way outside of the corporate network by providing network settings for employees to use, with the settings including an encryption key. The corporation can change the key as desired (e.g., monthly), by downloading the file to employee's computers, e.g., to automatically update it as necessary whenever they logon. Then, employees wishing to securely share data can switch to the corporation's private sharing channel whenever desired.

Turning to an example usage of the present invention, consider two friends meeting in a park or other location where wireless internet access is not necessarily available. If the friends decide to exchange files, they can both bring up a "channel changer" program, i.e., corresponding to the channel manager 202 and its associated user interface 208, and thereby switch to an ad-hoc network channel, such as the "Public" channel. The user interface 208 may show each friend a list of all of the people in radio range who are tuned to the "Public" channel, including each other. The users may then exchange files. Note that more than two users can participate, and that the users may elect to configure and use a more private ad-hoc network channel, such as one that uses encryption; the encryption key may be maintained among the settings for that private channel. Other usages that can be accomplished with ad-hoc networking include playing multiplayer games, collaborating with other users, viewing presentations, and so forth. When finished, users may simply switch their machines back to another channel, such as the "Internet" channel, as desired.

In accordance with another aspect of the present invention, there may be different types of channels. For example, a simple channel is one type of channel, generally described thus far, which is able to establish a connection to one specific network. A complex channel is another type, and while capable of connecting to only one network at a time, is capable of connecting to different networks at different times, depending on which one of those networks is available. More particularly, a complex channel is associated with multiple sets of settings corresponding to multiple networks, and when selected, tries each network out in priority order until a connection is successfully achieved, or no set of settings remains to attempt. Note that a priority order is not required, as the user can simply just provide various sets of network settings in a random pattern, however in one implementation the present invention attempts connections in order, thus giving the user the ability to prioritize.

As described above, for a simple channel, to change the channel to channel X, the channel manager 202 "asks" channel X for its associated settings, e.g., by opening a network settings file associated with channel X and reading the settings in. The settings are then applied to the network driver 210. Note that the channel may be an object that is capable of opening the file to contain the settings internally, but may more simply comprise a straightforward mapping reference that allows the channel manager 202 to locate the file (or other collection of the network settings) from the channel's metadata. For a simple channel there is one group of settings as generally described above; the channel manager 202 sends those settings to the network driver 210 to cause it to connect to the new network.

Figure 5:
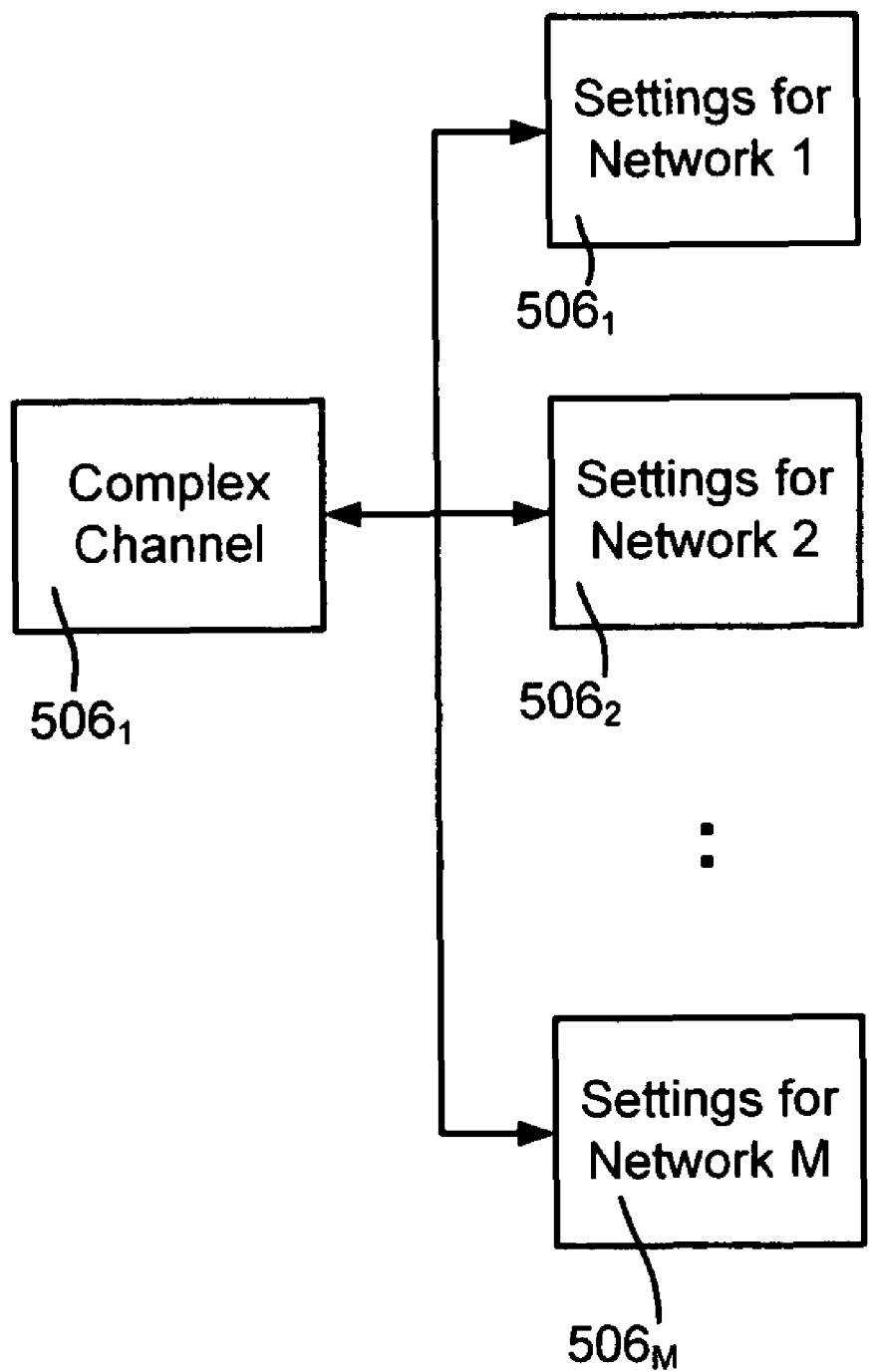
FIG. 5 is a block diagram generally representing the concept of a complex channel, in accordance with various aspects of the present invention.

FIG. 5 represents a complex channel 550 in which there are multiple groups of settings $552_1$-$552_M$, each group corresponding to one network of a plurality of networks. An example of a complex channel for the internet may be one that has settings for a work network, a home network, a free network, and a pay network. The channel manager 202 sends the first of these groups to the network driver 210 to attempt to connect to the first network. If that fails, the channel manager 202 tries the next group of settings, and so on until one succeeds or all networks are unavailable. Note that the network driver 210 can tell the channel manager 202 what is available, to thereby filter out attempts that will not work, and can also tell the channel manager 202 when a successful connection is established. Further, note that an attempt may be made to create an adhoc network (e.g. Public) in the event that no network is available.

Figure 6:
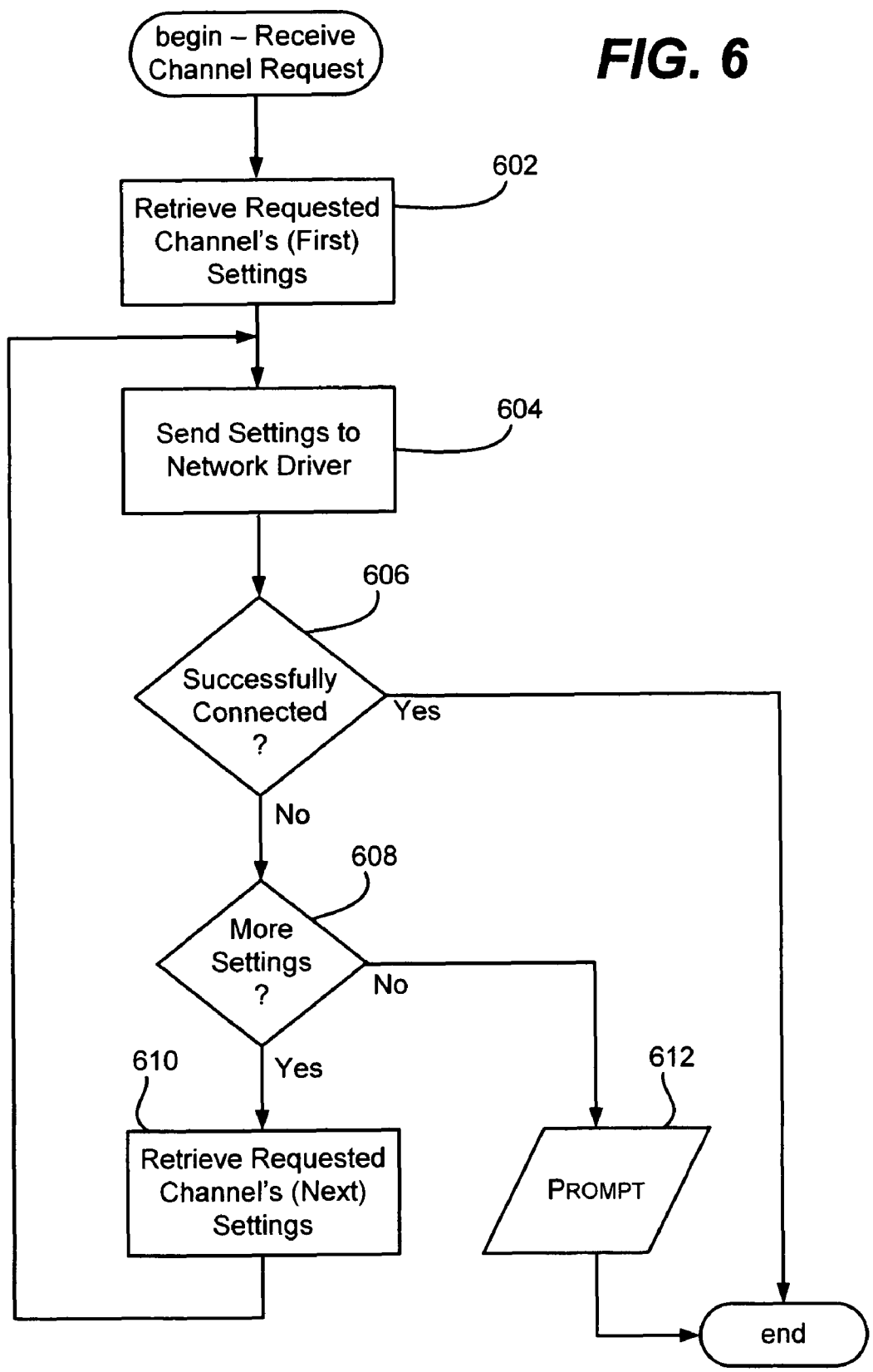
FIG. 6 is a flow diagram generally representing logic for connecting to a network, in accordance with various aspects of the present invention.

FIG. 6 summarizes the attempt process. Note that FIG. 6 works for a simple channel as well as a complex channel, with a simple channel having only one set of settings to attempt. Thus, step 602 represents retrieving the settings of the requested channel, which for a simple channel is the only set, or is the first set of settings (e.g., in priority order) for a complex channel. Step 604 represents the channel manager 202 sending those settings to the network driver.

Step 606 evaluates the success of the attempt, which may include some suitable delay to give the network driver time to establish a connection, have credentials verified, and so forth. The user may specify the delay, or the system may learn one based on actual results or results known from similar types of settings. If successfully connected, step 606 ends the connection-attempt process.

If not successfully connected at step 606, step 608 represents looking for additional settings to apply. If there are none, such as in the case of a simple channel or a complex channel once all settings have been attempted, step 608 branches to step 612, which represents notifying the user of the inability to connect on the desired channel. Note that some number of retries may be attempted before the prompt is given.

If there is another set of settings to attempt at step 608, step 610 requests retrieving the next set, which continues in the priority ordering. Step 610 returns to step 604 to attempt the next settings, and the process repeats until a successful connection is detected at step 606, or no settings remain to attempt at step 608. Note that an actual attempt need not be made if the channel manager knows from other information that the corresponding network is not available, such as known from the driver 210.

Turning to another aspect of the present invention, it is possible that the user or system has changed a network setting outside of the channel manager, e.g., the user may manually make a change, or the system may apply default settings following a reboot. In many instances, the channel manager 208 is able to determine a channel corresponding to the current network settings. To this end, the channel manager 202 asks the network driver 210 for the current settings. The channel manager 202 then iterates through its channels, looking for a channel with matching settings. If found, that channel is considered to be the current channel. In the event that a matching channel is not found, the user can be asked whether a channel should be named and maintained for the current settings, e.g., to allow a user to make changes and associate a new channel with the changed settings.

Figure 7:
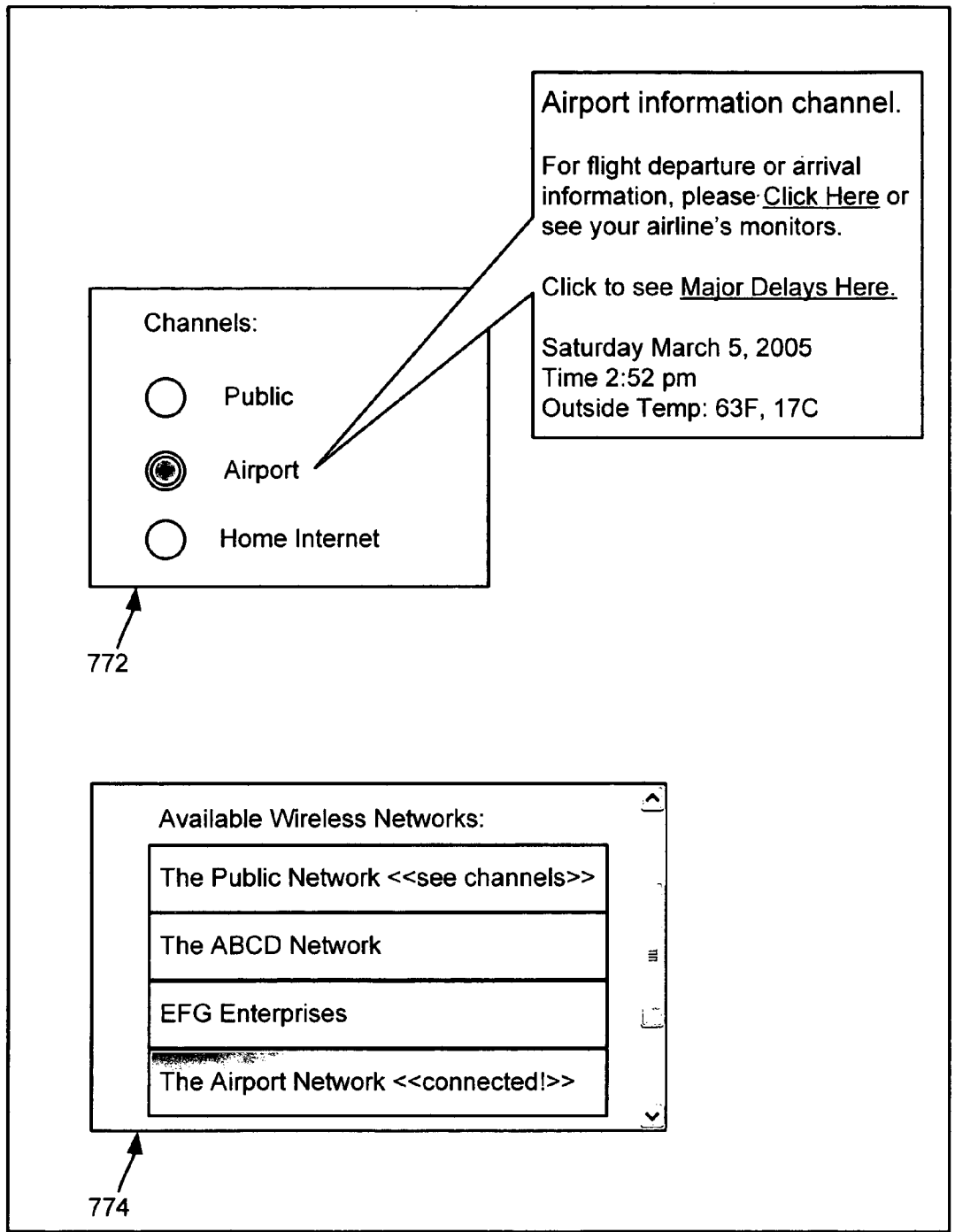
FIG. 7 is a representation of user interface elements showing a channel-based mechanism for selecting a set of network settings, example metadata received on a channel, and a list of available networks, in accordance with various aspects of the present invention.

Another aspect to the present invention involves metadata that may be received while the user is tuned to a particular channel, or in general may be received by the wireless networking system from accessible networks. By way of example, FIG. 7 shows how a channel-related user interface 770 that allows channel selection via a radio-button mechanism 774 can also display text or other data representing metadata received while on that channel. Note that if the user interface is properly configured, the user may select a link in the metadata to obtain a different set of metadata, or run a program such as by hosting a browser control, to obtain more information from the connected network.

Metadata can be used for many purposes, including describing a network (e.g., our network is for playing poker, these are the rules we are using), or posting information (e.g., car for sale, 2004 model X, email here for more information). A channel may be provided for the purpose of posting to and reading from a bulletin board. The information can also include the settings for connecting to another network, such as a premium network having more information. Contact information/a social network may also be obtained via a channel. For example, a channel may be defined for a project-related network. Such a network may be searched, such as to find employees working on that project, to determine an email list.

Moreover, a list 774 of other currently available wireless networks may be presented to the user, including networks for which the user does not have a defined channel. Note that while the ability to see available networks exists today, available networks may be tied to the channel concepts of the present invention. For example, in FIG. 7, the user may be shown an indication that a given network is currently connected, and that another network is available for which the user has a channel, such as known from a previous connection thereto. Note that such a user interface 770 can be configured by the user to not show available networks, and only show the user's channels. Additional information from metadata obtained via networks that are available but non-connected also may be displayed in the channel user interface 770. Normally such additional metadata is filtered, but is received and is thus displayable; further if the network corresponds to a channel, information known to the system about the channel may be displayed instead of or in addition to metadata related to that channel.

As can be seen from the foregoing detailed description, there is provided a method and system that uses channels to hide the complexity of network settings and make changing network settings easier. This present invention thus makes a very complex task significantly easier for computer users.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
displaying, in a user interface on a display device, a collection of channels wherein each channel corresponds to a different type of network, the collection of channels comprising at least an Internet channel for connecting to the Internet and a public channel for connecting to nearby users, wherein one or more sets of network settings are associated with each of the channels, wherein each of the one or more sets of network settings is stored in a single file such that a channel may be added to the collection of channels by receiving a new file;
upon a user selecting one of the channels displayed in the user interface, accessing the file corresponding to a first set of network settings associated with the selected channel and applying the first set of network settings from the file to connect to the type of network corresponding to the selected channel;
after connecting to the type of network corresponding to the selected channel, detecting that the user has changed a network setting manually;
querying the network driver for current network settings;
receiving the current network settings from the network driver; and
comparing the current network settings to the network settings associated with each channel to determine whether the current network settings correspond to one of the network settings associated with one of the channels such that upon determining that the current network settings do not correspond to any of the network settings associated with each channel, the user is prompted to store the current network settings as the network settings for a new channel.

2. The method of claim 1 wherein applying the first set of network settings to connect to the type of network corresponding to the selected channel comprises communicating the network settings to a network driver.

3. The method of claim 1 wherein the channel comprises a simple channel that corresponds to a single set of network settings.

4. The method of claim 1 wherein the channel comprises a complex channel that corresponds to a plurality of sets of network settings, and wherein applying the first set of network settings to connect to the type of network corresponding to the selected channel comprises selecting the first set from the plurality of sets of network settings and applying the first set of network settings.

5. The method of claim 4 wherein the first set is selected based on a priority order and upon connecting with the network using the first set of network settings, making no further attempt to connect to the network using the other sets of the plurality of sets of network settings.

6. The method of claim 4 further comprising, obtaining information about available networks that correspond to the type of network, and wherein the first set of network settings is selected only when the network that corresponds to the first set of network settings is available.

7. The method of claim 1 further comprising, displaying metadata related to a channel in the user interface.

8. The method of claim 1 further comprising, displaying a list of available networks, including providing a visible indication of an available network that corresponds to a channel.

9. The method of claim 7, wherein the metadata includes network settings for creating a new channel to connect to a new network.

10. The method of claim 1, further comprising:
receiving a new file that includes a modified version of the first set of network settings corresponding to the selected channel; and
replacing the existing file that includes the first set of network settings with the new file such that the modified version of the first set of network settings are used to connect to the type of network corresponding to the selected channel.

11. The method of claim 10, wherein the modified version of the first set of network settings comprises a new encryption key that is used to encrypt data that is sent over the type of network corresponding to the selected channel.

12. The method of claim 10, wherein the existing file is stored on a first computer and wherein the new file is transmitted from a second computer, and wherein the existing file is replaced automatically without user intervention at the first computer.

13. At least one computer-readable storage medium having computer-executable instructions, which when executed perform a method comprising:
displaying, in a user interface, a collection of channels wherein each channel corresponds to a different type of network, the collection of channels comprising at least an Internet channel for connecting to the Internet and a public channel for connecting to nearby users, wherein one or more sets of network settings are associated with each of the channels, wherein each of the one or more sets of network settings is stored in a single file such that a channel may be added to the collection of channels by receiving a new file;
upon a user selecting one of the channels displayed in the user interface, accessing the file corresponding to a first set of network settings associated with the selected channel and applying the first set of network settings from the file to connect to the type of network corresponding to the selected channel;
after connecting to the type of network corresponding to the selected channel, detecting that the user has changed a network setting manually;
querying the network driver for current network settings;
receiving the current network settings from the network driver; and
comparing the current network settings to the network settings associated with each channel to determine whether the current network settings correspond to one of the network settings associated with one of the channels such that upon determining that the current network settings do not correspond to any of the network settings associated with each channel, the user is prompted to store the current network settings as the network settings for a new channel.

14. The computer-readable storage medium of claim 13 wherein the user interface allows selection of only one channel at a time.

15. The computer-readable storage medium of claim 14 further comprising, displaying metadata in association with the user interface.

16. The computer-readable storage medium of claim 13 further comprising, pre-configuring a computer system with at least one channel and corresponding network settings.

17. In a computing environment having a network driver, a system comprising:
a processor; and
memory storing instructions which when executed by the processor perform a method comprising:

displaying, in a user interface, a collection of channels wherein each channel corresponds to a different type of network, the collection of channels comprising at least an Internet channel for connecting to the Internet and a public channel for connecting to nearby users, wherein one or more sets of network settings are associated with each of the channels, wherein each of the one or more sets of network settings is stored in a single file such that a channel may be added to the collection of channels by receiving a new file;

upon a user selecting one of the channels displayed in the user interface, accessing the file corresponding to a first set of network settings associated with the selected channel and applying the first set of network settings from the file to connect to the type of network corresponding to the selected channel;

after connecting to the type of network corresponding to the selected channel, detecting that the user has changed a network setting manually;

querying the network driver for current network settings;

receiving the current network settings from the network driver;

comparing the current network settings to the network settings associated with each channel to determine whether the current network settings correspond to one of the network settings associated with one of the channels such that upon determining that the current network settings do not correspond to any of the network settings associated with each channel, the user is prompted to store the current network settings as the network settings for a new channel.

18. The system of claim 17 wherein the channel comprises a simple channel that corresponds to a single set of network settings.

19. The system of claim 17 wherein the channel comprises a complex channel that corresponds to a plurality of sets of network settings.

* * * * *